(12) United States Patent
Haldorson et al.

(10) Patent No.: US 9,753,798 B1
(45) Date of Patent: Sep. 5, 2017

(54) METHOD AND APPARATUS FOR ELECTRONIC DESIGN AUTOMATION

(71) Applicant: Microsemi Solutions (U.S.), Inc., Aliso Viejo, CA (US)

(72) Inventors: Jon Haldorson, Hillsboro, OR (US); Joseph Rhodes, Portland, OR (US); Gwyneth Morrison, Ottawa (CA); Kevin Clements, Ottawa (CA)

(73) Assignee: MICROSEMI SOLUTIONS (U.S.), INC., Aliso Viejo, CA (US)

( * ) Notice: Subject to any disclaimer, the term of this patent is extended or adjusted under 35 U.S.C. 154(b) by 189 days.

(21) Appl. No.: 14/620,033

(22) Filed: Feb. 11, 2015

(51) Int. Cl.
*G06F 9/455* (2006.01)
*G06F 17/50* (2006.01)
*G06F 11/07* (2006.01)

(52) U.S. Cl.
CPC ...... *G06F 11/0787* (2013.01); *G06F 11/0769* (2013.01)

(58) Field of Classification Search
USPC ......... 716/104, 105, 106, 108, 111, 112, 113
See application file for complete search history.

(56) References Cited

U.S. PATENT DOCUMENTS

| 5,896,300 | A  | * | 4/1999  | Raghavan | G06F 17/5022 703/15 |
| 6,263,301 | B1 | * | 7/2001  | Cox      | G06F 17/5022 702/67 |
| 8,104,015 | B2 | * | 1/2012  | Bohl     | G06F 17/50 716/100 |
| 2008/0276206 | A1 | * | 11/2008 | Mariani | G06F 11/2252 716/136 |

* cited by examiner

*Primary Examiner* — Brian Ngo
(74) *Attorney, Agent, or Firm* — Dennis R. Haszko

(57) ABSTRACT

A method and system for automatically auditing an electronic component design process comprising a plurality of design steps. The method includes: extracting, optionally in parallel and in a single pass, a plurality of non-error data types from obtained electronic component design information to produce one or more summary files; and determining whether an audit failure exists in a current design step of the plurality of design steps based on a comparison of the one or more summary files with one or more stored failure indicators. The one or more stored failure indicators comprising a plurality of non-error triggers associated with later failures. The present disclosure simplifies the organization of the gathered data to prevent the automated electronic design process from generating an inferior design, which wastes time of both human and computing resources.

24 Claims, 13 Drawing Sheets

```
[ "filter_rtl_warnings",0,"unwaived","Use_stack","" ],
[ "filter_rtl_warnings",0,".*\[VHDL-645]","Waive","" ],
[ "filter_rtl_warnings",0,".*\[CDFG-370]","Waive","" ],
[ "filter_rtl_warnings",0,".*\[CDFG-331]","Waive","" ],
[ "filter_rtl_warnings",0,".*\[VHDL-616]","Waive","" ],
[ "filter_rtl_warnings",0,"waived","Group_msg","" ],
```

FIG. 7

```
[ "filter_rtl_info",0,"unwaived","Use_stack","" ],
[ "filter_rtl_info",0,".*\[CDFG-362]","Waive","" ],
[ "filter_rtl_info",0,".*\[CDFG-372]","Waive","" ],
[ "filter_rtl_info",0,".*\[CDFG2G-616]","Waive","" ],
[ "filter_rtl_info",0,".*\[ELABUTL-130]","Waive","" ],
[ "filter_rtl_info",0,".*\[CDFG-479]","Waive","" ],
[ "filter_rtl_info",0,"waived","Group_msg","" ],
```

FIG. 8

```
[ "qor_slack",0,"","Comment","prints table of slacks in $(TSB)_qor_ZWLM.rpt" ],
[ "qor_slack",0,"",".*Cost\s*Critical\s*Violating","If","" ],
[ "qor_slack",10,"TBL:qor_ZWLM_slack","Settype","" ],
[ "qor_slack",20,"","Save_stack","","" ],
[ "qor_slack",20,"","","Drop","" ],
[ "qor_slack",20,".*Total","Until","," ],
[ "qor_slack",30,"","Save_stack","" ],
[ "qor_slack",30,"","Reset","" ],
[ "qor_slack",0,"","Drop","" ],
[ "qor_slack",0,"","While","" ],

[ "VT_usage_table",0,"","Comment","print VT usage table from $(TSB)_gate_ZWLM.rpt" ],
[ "VT_usage_table",0,".*total","If","" ],
[ "VT_usage_table",5,"TBL:ZWLM_VT_usage","Settype","" ],
[ "VT_usage_table",10,"","Drop","" ],
[ "VT_usage_table",10,"\s*\s*","Until","contains a non-whitespace character" ],
[ "VT_usage_table",11,"","Drop","" ],
[ "VT_usage_table",11,"\s*$","Until","blank line -- skips a table" ],
[ "VT_usage_table",12,"","Drop","" ],
[ "VT_usage_table",12,"\s*\S","Until","contains a non-whitespace character" ],
[ "VT_usage_table",20,"","Save_stack","" ],
[ "VT_usage_table",20,"","Drop","" ],
[ "VT_usage_table",20,"\s*$","Until","empty line" ],
[ "VT_usage_table",30,"","Reset","" ],
[ "VT_usage_table",0,"","Drop","" ],
[ "VT_usage_table",0,"","While","" ],
```

```
{ "power", 0, "^\s*Leakage\s+Leakage", "If", "Starting pattern" },
{ "power", 10, "TBLigor:power", "Settype", "" },
{ "power", 20, "", "save_stack", "save table --- just print in offline mode" },
{ "power", 20, "", "Drop", "" },
{ "power", 20, "^\s*$", "Until", "blank line" },
{ "power", 30, "", "Drop", "ignore all tables after 1st one" },
{ "power", 30, "", "While", "ignore all tables after 1st one" },
{ "power", 0, "", "Drop", "ELSE #1 part of outer If" },
{ "power", 0, "", "While", "ELSE #1 part of outer If" }, 10-########  power ../syn/rpts/pm88_60_253_core_gate_2WLM.rpt  ########
10- during step: syn_core at Wed Jan 30 18:08:41 2013
10- ==== TBLigor:power ====

Leakage       Leakage    Internal         Internal
Library                        Instances Instances %    Area        Power (nW)    Power %    Power (nW)       Power %
arm_tr9_c31_svt_ss_0v85_p0          10790       4.8     35913.000   5546644.706     36.0     1619159.922         3.9
arm_tr9_c35_hvt_ss_0v85_p0         199001      87.4    555034.250   3920340.253     25.5    18190294.455        43.6
arm_tr9_c35_svt_ss_0v85_p0          13286       5.8     32734.500   1663470.241     10.8     1373894.944         3.3
1w10_33_100_sprhsw256x64_lib            1       0.0         0.000      1631.950      0.0       37732.486         0.1
1x20_15_137_qtm                         1       0.0         0.000         0.000      0.0           0.000         0.0
pm80_60_253_dprw512x72_lib              4       0.0         0.000     45595.766      0.3     8268662.676        19.8
pm80_60_253_sprbs512x23_lib             2       0.0         0.000      3239.546      0.0     1432671.573         3.4
pm80_60_253_sprhsw512x36_lib           16       0.0         0.000     26737.213      0.2     5440045.098        13.1
pmc_cells_arm_tr9_c35_hvt_ss_0v85_p0 2252       1.0      6756.000     76522.673      0.5      311103.896         0.7
pmc_clk_arm_tr9_c35_lvt_ss_0v85_p0   2180       1.0     12011.000   2822236.396     18.3     2426996.119         5.8 pmc_sync_flops_arm_tr9_ss_0v85_p0     899       0.4      8970.000   1288893.415      8.4     2588954.606         6.2
```

FIG. 11

```
!0-####### map_clk_gater_table ../syn/logs/pm99_60_253_core_stripped.log ########
!0-   during step: syn_core at Wed Jan 30 18:08:07 2013
!0- ---- TBL:MAP:clk_gate ----
Category                                  Number    Percentage
-----------------------------------------------------------------
Gated flip-flops                          47584        89%
Ungated flip-flops
  Cannot map to requested logic               0         0%
  Enable signal is constant                   0         0%
  Excluded from clock-gating                  0         0%
  User preserved                            490         1%
  Libcell unusable                            0         0%
  Excluded due to internal reason          3095         6%
  Timing exception in enable logic            0         0%
  Register bank width too small            2131         4%
-----------------------------------------------------------------
Total flip-flops                          53300       100%
```

FIG. 12

```
"deleted_flops_count",0,"deleted_flops_count.rpt","File_dest","" ],
[ "deleted_flops_count",0,"number unwaived","Separate","" ],
[ "deleted_flops_count",0,"unwaived_count","Do_audit","" ],
[ "deleted_flops_count",0,"number waived","Separate","" ],
[ "deleted_flops_count",0,"waived_count","Do_audit","" ],
[ "deleted_flops_count",0,"number of unused waivers","Separate","" ],
[ "deleted_flops_count",0,"unused_waivers_count","Do_audit","" ],
```

FIG. 13

```
{ "DIFILL_fil_qty_inserted", 0, "", "Comment", "prints line" },
{ "DIFILL_fil_qty_inserted", 0, "", "Comment", "targets: Info: inserted.*functional lockup latches" },
{ "DIFILL_fil_qty_inserted", 0, "\s*Info:\s*inserted.*functional lockup latches", "if", "" },
{ "DIFILL_fil_qty_inserted", 10, "VAL:FIL_qty_inserted", "Settype", "" },
{ "DIFILL_fil_qty_inserted", 10, "", "Save_stack", "" },
{ "DIFILL_fil_qty_inserted", 20, "", "Reset", "" },
{ "DIFILL_fil_qty_inserted", 0, "", "Drop", "" },
{ "DIFILL_fil_qty_inserted", 0, "", "While", "" },
```

FIG. 14

```
{ "DIFILL_chain_length", 0, "*DFT actual scan chains", "if", "" },
{ "DIFILL_chain_length", 10, "VAL:chain_length", "Settype", "" },
{ "DIFILL_chain_length", 10, "", "Save_stack", "" },
{ "DIFILL_chain_length", 10, "", "Drop", "" },
{ "DIFILL_chain_length", 10, "", "Save_stack", "" },
{ "DIFILL_chain_length", 20, "", "Drop", "" },
{ "DIFILL_chain_length", 20, "*object name|.*length|.*test_clock edge", "if", "" },
{ "DIFILL_chain_length", 20, "", "Save_stack", "" },
{ "DIFILL_chain_length", 30, "", "Break", "" },
{ "DIFILL_chain_length", 20, "^\S", "Until", "" },
{ "DIFILL_chain_length", 30, "", "Reset", "" },
{ "DIFILL_chain_length", 0, "", "Drop", "" },
{ "DIFILL_chain_length", 0, "", "while", "" },
```

FIG. 15

METHOD AND APPARATUS FOR ELECTRONIC DESIGN AUTOMATION

FIELD

The present disclosure relates to electronic design automation (EDA), including but not limited to electronic component design processes using EDA tools.

BACKGROUND

The design of electronic components, or electronic devices, includes a number of steps performed by a designer using a variety of tools. In some implementations, aspects of the electronic component design process are automated.

Automated electronic component design methods, also known as electronic component design flows, involve a sequence of steps that are performed using electronic device automation (EDA) tools.

EDA tools are notorious for generating volumes of detail and information, some of which is crucial. In many cases, a significant portion of this information to be reviewed is extracted manually (text captures) or by using text editors/viewers.

Improvements to electronic device design methods are therefore desirable.

BRIEF DESCRIPTION OF THE DRAWINGS

Embodiments of the present disclosure will now be described, by way of example only, with reference to the attached Figures.

FIG. 7 illustrates a sub-set of extracted warning messages according to an example embodiment of the present disclosure.

FIG. 8 illustrates a sub-set of extracted information messages according to an example embodiment of the present disclosure.

FIG. 9 illustrates filters to extract gate count and VT mix information according to an example embodiment of the present disclosure.

FIG. 10 illustrates a table extracted using the filters of FIG. 9 according to an example embodiment of the present disclosure.

FIG. 11 illustrates filters to extract a power summary according to an embodiment of the present disclosure and a power summary extracted using those filters according to an example embodiment of the present disclosure.

FIG. 12 illustrates a table extracted out of an output file according to an example embodiment of the present disclosure.

FIG. 13 illustrates a filter to extract information used to count a number of flops deleted or merged together during a design process according to an example embodiment of the present disclosure.

FIG. 14 illustrates a filter to extract information used to detect if lockup latches were inserted during a design process according to an example embodiment of the present disclosure.

FIG. 15 illustrates a filter to extract information used to detect when scan chains are stitched during a design process according to an example embodiment of the present disclosure.

DETAILED DESCRIPTION

Figure 1:
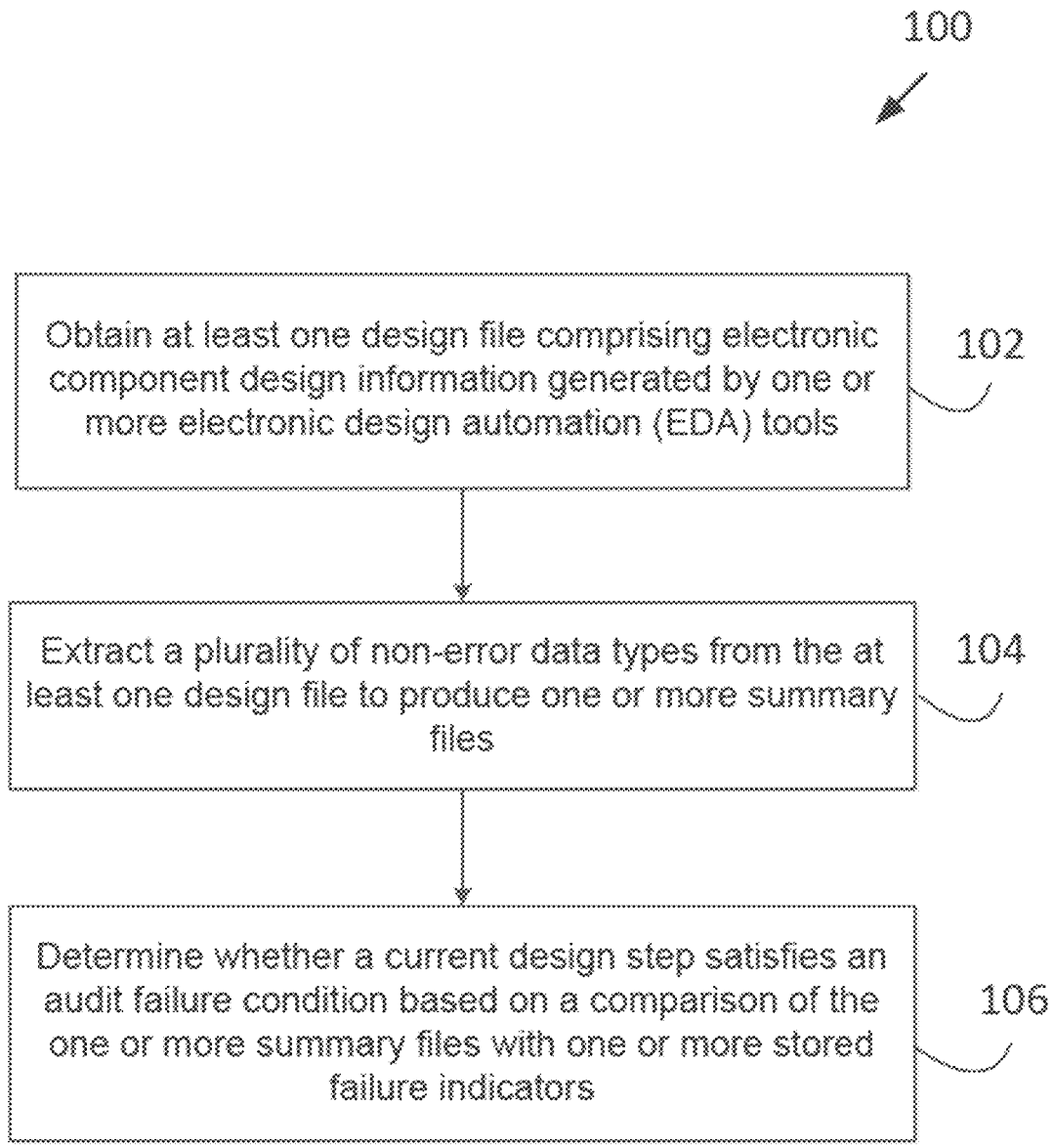
FIG. 1 is a flow chart illustrating a method of auditing an electronic component design process in accordance with an embodiment of the present disclosure.

A method and system are provided for automatically auditing an electronic component design process comprising a plurality of design steps. The method includes: extracting, optionally in parallel and in a single pass, a plurality of non-error data types from obtained electronic component design information to produce one or more summary files; and determining whether an audit failure exists in a current design step of the plurality of design steps based on a comparison of the one or more summary files with one or more stored failure indicators. The one or more stored failure indicators comprise a plurality of non-error triggers associated with later failures. The present disclosure simplifies the organization of the gathered data to prevent the electronic design process from generating an inferior design, which wastes time of both human and computing resources.

In an implementation, the present disclosure relates to data gathering of EDA design information generated during an electronic device design process. In an example embodiment, the electronic design process comprises an automated electronic device design process. In an example embodiment, an in-line audit architecture with parsing engine provides a method of extracting useful data necessary to ensure an IP-core is built according to specified design intent. This is accomplished in an embodiment by extracting predetermined sections of relevant design details of interest from EDA vendor's tool logs and report files, which are together referred to as design files comprising electronic component design information. These EDA logs and reports are collated and checked in a manner to ensure the design is correct with respect to design intent and meets goals, including, but not limited to timing, area and power.

Embodiments of the present disclosure can apply to any electronic component design process, including the parsing capabilities which operate on text files. In example implementations, the data parsed out and checked happens in a fully automated mode as well as a single stepping mode in which a circuit designer manually goes through each step. When embodiments of the present disclosure are used in fully automated mode, an additional benefit is provided since the flow will stop when an audit failure is detected.

In another embodiment, a parser according to an embodiment of the present disclosure is applied outside of an EDA tool and tool output environment. In an example embodiment, a parser is provided in a production line environment where data can be collected and used in a multi-step process. For example, a parser according to an embodiment of the present disclosure can be provided in association with an assembly line system, such as automotive assembly, printed circuit board assembly, beer making, fabric weaving, clothes making, etc. In an example implementation, a parser according to an embodiment of the present disclosure is in communication with a production line database including data files; the parser can include filters for extracting data from the data files to assist in determining where failures or non-conformities may be budding. In another implementation, a parser according to an embodiment of the present disclosure is provided in association with a news or financial data system, and configured to extract data such as specific stock market data, stock trends, news headers.

In an embodiment, the present disclosure provides a method of automatically auditing an electronic component design process comprising a plurality of design steps. The method comprises: obtaining at least one design file comprising electronic component design information generated by one or more electronic design automation (EDA) tools; extracting a plurality of non-error data types from the at least one design file to produce one or more summary files; and determining whether an audit failure exists in a current design step of the plurality of design steps based on a comparison of the one or more summary files with one or more stored failure indicators, the one or more stored failure indicators comprising a plurality of non-error triggers associated with later failures.

In an example embodiment, obtaining comprises aggregating data generated by a plurality of EDA tools to obtain the electronic component design information.

In an example embodiment, determining comprises determining that an audit failure exists in the current design step in response to detection of a match between contents of the one or more summary files and one of the plurality of non-error triggers.

In an example embodiment, determining comprises determining that an audit failure exists in the current design step in response to detection of a match between one of the plurality of non-error data types in the one or more summary files and selected non-error data in the one or more stored failure indicators.

In an example embodiment, the method further comprises generating a process termination indication in response to determining that an audit failure exists in the current design step.

In an example embodiment, determining comprises determining that the current design step is free of an audit failure and represents an audit success in response to an absence of the plurality of non-error triggers from contents of the one or more summary files.

In an example embodiment, the one or more stored failure indicators comprise a correlation of the plurality of non-error triggers with the later failures with respect to a stored design step corresponding to the current design step.

In an example embodiment, the later failures comprise failures that occur at a second design step that is subsequent to the current design step in the electronic component design process.

In an example embodiment, the obtaining is performed in relation to a subset of the electronic component design information associated with the current design step, and wherein the extracting is performed with respect to a subset of the plurality of non-error data types.

In an example embodiment, the at least one design file comprises a single design file, and wherein the extracting the plurality of non-error data types from the single design file is performed in parallel and in a single pass.

In an example embodiment, the plurality of non-error data types comprises first and second sets of non-error data types, and wherein extracting in the single pass comprises: outputting the first set of non-error data types to the one or more summary files; and storing the second set of non-error data types in a memory stack for additional processing subsequent to the single pass.

In an example embodiment, the method further comprises processing the second set of non-error data types in the memory stack to produce a remaining portion of the one or more summary files.

In an example embodiment, the obtaining, extracting and determining are performed during the electronic component design process in a single clock cycle per extraction.

In an example embodiment, the extracting is performed based on stored parsing filters comprising the one or more stored failure indicators, and the method further comprises extracting and chaining together a plurality of orthogonal non-error data types so as to perform the extracting in a single pass.

In an example embodiment, the at least one design file comprises a single design file, and wherein the extracting the plurality of non-error data types from the single design file is performed sequentially.

In an example embodiment, the at least one design file comprises a plurality of design files, and wherein the extracting the plurality of non-error data types from the plurality of design files is performed in parallel. In an example embodiment, extracting the plurality of non-error data types from the plurality of design files is performed in a single pass.

In another embodiment, the present disclosure provides a system for auditing an electronic component design process, the process including a plurality of design steps which call one or more electronic design automation (EDA) tools to complete the design steps. The system comprises: a database configured to receive and store at least one design file comprising electronic component design information generated by the EDA tools; and a design automation process analyzer, in communication with the database, configured to extract details of interest from the at least one design file in accordance with parsing filters to generate one or more summary files, and to determine whether an audit failure exists in a current design step of the plurality of design steps based on a comparison of the one or more summary files with one or more stored failure indicators, the one or more stored failure indicators comprising a plurality of non-error triggers associated with later failures.

In an example embodiment, the system further comprises a filter memory, in communication with the design automation process analyzer, storing the parsing filters configured to extract details of interest for generating the one or more summary files.

In an example embodiment, the system further comprises a memory stack, in communication with the design automation process analyzer, configured to store a subset of non-error data types for additional processing subsequent to the single pass.

In an example embodiment, the system further comprises a plurality of memory stacks, in communication with the design automation process analyzer, each of the plurality of memory stacks configured to store a unique subset of non-error data types for additional processing subsequent to the single pass.

In an example embodiment, the database is configured to receive and store start and end times for each of the plurality of design steps.

In another embodiment, the present disclosure provides an apparatus for auditing an electronic component design process, the process including a plurality of design steps which call one or more electronic design automation (EDA)

tools to complete the design steps. The apparatus comprises: a memory storing parsing filters and a plurality of failure indicators, the plurality of stored failure indicators comprising a plurality of non-error triggers associated with later failures; an extractor configured to extract, based on the stored parsing filters, a plurality of non-error data types from at least one design file to produce one or more summary files, the at least one design file comprising electronic component design information produced by the one or more EDA tools; and a comparator configured to determine whether an audit failure exists in a current design step of the plurality of design steps based on a comparison of the one or more summary files with one or more stored failure indicators.

In a further embodiment, the present disclosure provides an apparatus for auditing an electronic component design process, the process including a plurality of design steps which call one or more electronic design automation (EDA) tools to complete the design steps. The apparatus comprises: a memory storing parsing filters; an extractor configured to extract, based on the stored parsing filters, a plurality of non-error data types from at least one design file to produce one or more summary files, the at least one design file comprising electronic component design information produced by the one or more EDA tools; and a comparator configured to determine whether an audit failure exists in a current design step of the plurality of design steps based on a comparison of the one or more summary files with one or more stored failure indicators, the one or more stored failure indicators comprising a plurality of non-error triggers associated with later failures.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 is a flow chart illustrating a method of automatically auditing an electronic component design process in accordance with an embodiment of the present disclosure. The process comprises a plurality of design steps. The method comprises, at 102, obtaining at least one design file comprising electronic component design information generated by one or more electronic design automation (EDA) tools. The electronic component design information is based on information output from one or more EDA tools, such as reports and log files. The report files and log files are examples of design files.

In an example embodiment, the step 102 comprises aggregating data generated by one or more EDA tools to obtain the at least one design file comprising electronic component design information. Aggregating data from a plurality of EDA tools provides benefits when performing audits for ease of viewing, data mining or other similar functions. Extracted data can be aggregated, for example in an automated electronic device design process, even when one EDA tool is used. Some EDA tools can execute many different functions sequentially, as driven by a scripted flow. Aggregating the data together, such as in a single design file, provides access to many details of consequence which can be used to determine if the process should continue. Some of this aggregated data can go directly into an audit of the build process.

At 104, the method comprises extracting a plurality of non-error data types from the at least one design file to produce one or more summary files. Non-error data types represent data types within the electronic component design information such as warnings, information items, or other recognizable blocks of code that are not errors. In an example embodiment, the determination of whether a data type is a non-error data type is made with respect to a selected, or active, electronic component design process. For example, a given data type can be an error with respect to a first electronic component design process, and can be an information item with respect to a second electronic component design process. A subset of the extracted information, optionally divided into smaller portions, can be uploaded to a database for future reference, such as to detect trends in quality.

The plurality of non-error data types are a subset of the obtained electronic component design information, and represent information of interest with respect to auditing the process for conformity to established design parameters. The established design parameters can include timing parameters, area parameters, or power parameters. Each of these parameters can comprise constraints, thresholds or ranges defining permissible values for the respective parameter.

In an example embodiment, the one or more summary files produced in 104 comprise a compilation of the obtained plurality of non-error data types. When more than one summary file is produced, each summary file can be produced so as to include or comprise related sets of non-error data types.

At 106, the method comprises determining whether an audit failure exists in a current design step of the plurality of design steps based on a comparison of the one or more summary files with one or more stored failure indicators. In an example embodiment, the current design step can represent any selected step in the electronic component design process. In an example embodiment, an audit failure exists when an audit failure condition is satisfied in the current design step. The one or more stored failure indicators comprise a plurality of non-error triggers associated with later failures. The one or more non-error triggers associated with later failures can be determined, or learned, based on data collected in relation to other design implementations relevant to a current design implementation, and can be used to create the filters to detect these non-error triggers which can function as early warning events.

While some known approaches are designed to pause or halt a design process in response to an error, in contrast embodiments of the present disclosure can pause or halt an electronic component design process in response to certain non-error values. The stored failure indicators provide a means to store these non-error values as non-error triggers that are associated with later failures. For example, the one or more stored failure indicators can comprise a correlation of the plurality of non-error triggers with the later failures with respect to a stored design step that corresponds to the current design step in a particular electronic component design process. The later failures comprise failures that occur at a second design step that is subsequent to the current design step in the electronic component design process.

In an embodiment, the at least one design file comprises a single design file. In an example embodiment, the extracting in 104 the plurality of non-error data types from the single design file is performed in parallel and in a single pass.

In an example embodiment, the extraction, at 104, in a single pass refers to extracting the plurality of non-error data types by passing through the electronic component design information in the single design file only once. In an example embodiment, one or more filters are applied to the electronic component design information in a single pass therethrough.

In another example embodiment, the extraction at 104 in a single pass comprises calling a parser multiple times sequentially to extract the desired data to produce the one or more summary files. In an embodiment, the at least one design file comprises a single design file, and the extracting the plurality of non-error data types from the single design file is performed sequentially.

In an example implementation, filters are sent in batches targeting one type of information in the design file for that one pass. An example sequence is as follows: a design file, such as a log file, is opened for reading by the parser; a batch of filters are applied to collect one set of information; for example, one filter may extract multiple lines from a table, such as the clock gating table; a second filter flattens all the data into 1 line for uploading to the database; a third filter extracts one value from the table to determine if it met passing criteria; a fourth filter formats a header and writes the table data to a summary file, such as ila_imp_log.txt; the parser terminates with the data extraction and closes the log file. In an example implementation, the steps above are performed in a single-pass; however, in another implementation, the same log file can be opened multiple times by the parser to extract all of the data that was intended for the purposes of producing the one or more summary files. A parser may extract all data of interest in one instance of opening a design file containing the electronic component design information, or may open the design file multiple times, the methodology of collecting information for auditing purposes and to terminate a bad build remains.

In another example implementation, an EDA tool provides a plurality of outputs, which can include more than one file per step; for instance, a syn_* step will output logs, reports (rpts), and a netlist. Performing operations in a single pass refers to walking through a particular output, such as a specific log file, and looking for a particular piece of data to do one or more operations on. The data of interest is extracted in a single pass and then operations are performed on the extracted data.

For example, suppose a logfile is output from an EDA tool. Filters are provided to tell the parser to walk though that logfile looking for a particular piece of data. That data will be extracted from the logfile the first time through (this is the "single pass"). Only the data in question, or the data of interest, is stored on a stack for further manipulation. Subsequent filters will operate only on the stacks internal to the parser, permitting the data to be formatted multiple ways and to search for failure indicators, which are signatures of later fails. All the parser/filters does is find the failure indicator, killing/aborting the run as mentioned in claims 4 and 5 is how the flow reacts to this data being extracted.

In example embodiments, the data output from the EDA tools can be used for one or more of: reducing the data to one or more key/value pairs; storing the data in a database; creating the various inline audit reports; searching for hints that this job will have a failure later on and providing a termination indication; generating a customized script to better run the next step (example is the syn_* log is used to build a better lec_dofile that is able to more effectively check what was done).

In another embodiment, the at least one design file comprises a plurality of design files, and the extracting the plurality of non-error data types from the plurality of design files is performed in parallel. In an example embodiment, extracting the plurality of non-error data types from the plurality of design files is performed in parallel and in a single pass.

In an example embodiment, the step 102 of determining comprises determining that an audit failure exists in the current design step in response to detection of a match between contents of the one or more summary files and one of the plurality of non-error triggers. In an example embodiment, the step 102 of determining comprises determining that an audit failure exists in the current design step in response to detection of a match between one of the plurality of non-error data types in the one or more summary files and selected non-error data in the one or more stored failure indicators. In an example embodiment, the method further comprises generating a process termination indication in response to determining that an audit failure exists in the current design step.

In an example embodiment, the step 102 of determining comprises determining that the current design step is free of an audit failure and represents an audit success in response to an absence of the plurality of non-error triggers from contents of the one or more summary files. For example, in such a case, the contents of the one or more summary files extracted with respect to the current design step would not match any non-error triggers.

In an example embodiment, the plurality of non-error data types comprises first and second sets of non-error data types. In such an example, extracting in the single pass comprises: outputting the first set of non-error data types to the one or more summary files; and storing the second set of non-error data types in a memory stack for additional processing subsequent to the single pass. The second set of non-error data types in the memory stack can be processed to produce a remaining portion of the one or more summary files.

In an example embodiment, the step 102 of obtaining is performed in relation to a subset of the electronic component design information associated with the current design step. In such a case, the step 104 of extracting is performed with respect to a subset of the plurality of non-error data types, the subset of the plurality of non-error data types being associated with the subset of the electronic component design information associated with the current design step.

In an example embodiment, the step 104 of extracting is performed based on stored parsing filters comprising the one or more stored failure indicators. In such a case, the method further comprises extracting and chaining together a plurality of orthogonal non-error data types so as to perform the extracting in a single pass.

Figure 2:
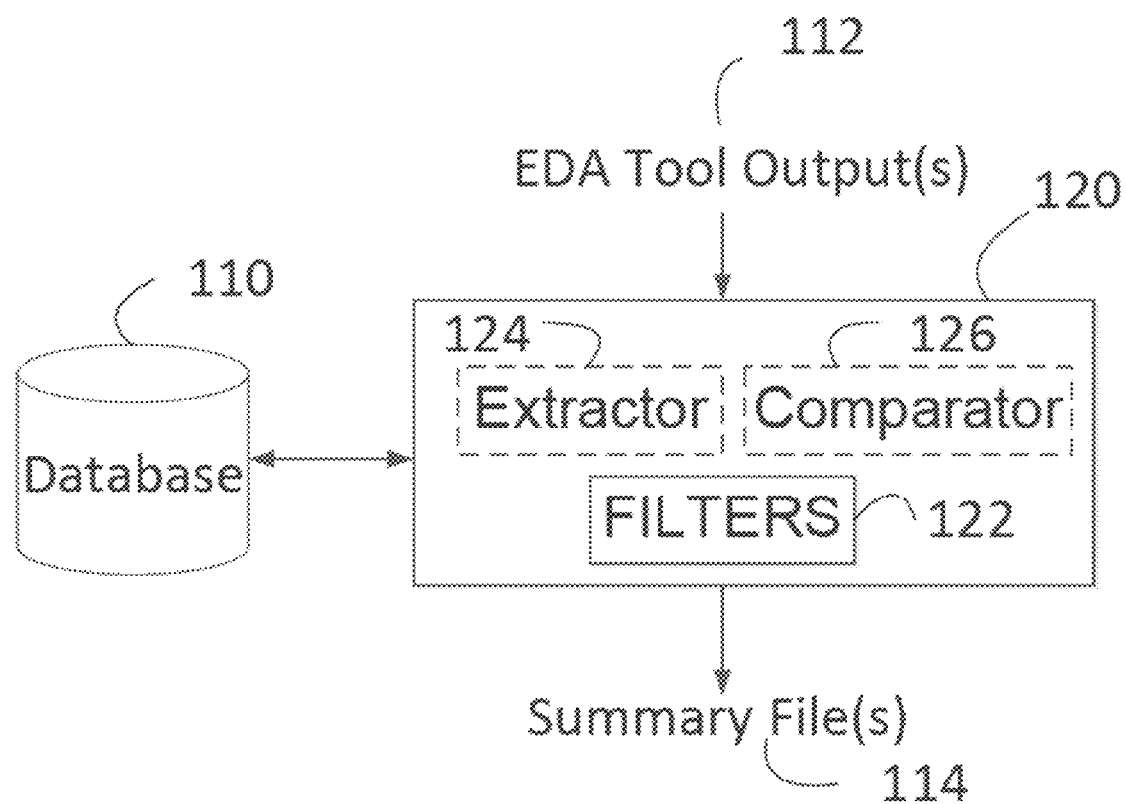
FIG. 2 is a block diagram illustrating a system for auditing an electronic component design process in accordance with an embodiment of the present disclosure.

FIG. 2 is a block diagram illustrating a system for auditing an electronic component design process in accordance with an embodiment of the present disclosure. The process includes a plurality of design steps which call one or more electronic design automation (EDA) tools to complete the design steps. The one or more EDA tools produce EDA Tool Outputs. The system comprises a computer-readable memory, such as a database 110, configured to receive and store output files generated by the EDA tools, shown as EDA Tool Outputs 112. In an example embodiment, the at least one design file referred to previously comprises, or includes information based on, one or more EDA Tool Outputs 112. In an example embodiment, parsed, formatted, extracted information is provided to the database 110. In an implementation, there may be some raw information from an EDA tool which is uploaded into the database. In another implementation, data is selected or cherry-picked prior to receipt at the database 110 so the database stays small.

In an example implementation, start and end times for each of the plurality of design steps are received and stored in the database 110. These start and end times, while not required for the extraction or parsing of data from the electronic component design information, can provide benefits for data mining and to identify that certain events or triggers happened and at what times. For example, start/end times can provide insight into how long a job is taking so runtime metrics can be extracted. It is also advantageous to identify long run time jobs, for example in a project view graphical user interface (GUI) to enable identification of troublesome blocks and the ability to provide guidance or proposed solutions.

The system of FIG. 2 comprises an apparatus 120, in communication with the database 110, configured to extract details of interest from the stored output files in accordance with parsing filters 122 to generate one or more summary files 114. In an example embodiment, the apparatus 120 comprises a design automation process analyzer. In another embodiment, the apparatus 120 comprises an audit parsing engine. In another embodiment, the apparatus 120 comprises a design auditor. In a further embodiment, the apparatus comprises an electronic design audit module. In the description below, the term apparatus is used in a non-limiting manner to refer an example implementation of an audit parsing engine as the apparatus 120.

The apparatus 120 is configured to determine whether an audit failure exists in a current design step of the plurality of design steps based on a comparison of the one or more summary files with one or more stored failure indicators. The one or more stored failure indicators comprise a plurality of non-error triggers associated with later failures. In an example embodiment, the apparatus 120 further comprises a filter memory storing the parsing filters configured to extract details of interest for generating the one or more summary files. In another embodiment, the system comprises a filter memory, and the filter memory is in communication with the apparatus 120.

In an example implementation, the filters are stored in a separate file to provide flexibility. In an embodiment, the filters are made to be extensible filters by allowing an auxiliary filter file to be called automatically if a file of a certain name exists. In another example implementation, separate filter files are provided which vary by the EDA tool version called, to provide improved performance tailored to a specific EDA tool version. In a further example implementation, a filter naming scheme is employed that provides for EDA tool-specific filter names which are easily interpreted and can optionally be authored or maintained by different users.

In an example implementation, the parser is the engine and the filters are the configurable component. Different types or data can be extracted by just modifying the filters, or using different filters, and leaving the parser unmodified. In an example embodiment, the system and method are extensible because of the filters. Any non-error data type or information of interest can be extracted by creating a suitable custom filter.

In an example embodiment, the system comprises a memory stack, in communication with the apparatus 120, configured to store a subset of non-error data types for additional processing subsequent to the single pass. In another example embodiment, the system comprises a plurality of memory stacks, in communication with the apparatus 120, each of the plurality of memory stacks configured to store a unique subset of non-error data types for additional processing subsequent to the single pass.

In a further example embodiment, also described in relation to FIG. 2, the present disclosure provides an apparatus for auditing an electronic component design process, the process including a plurality of design steps which call one or more electronic design automation (EDA) tools to complete the design steps.

The apparatus 120 comprises a memory storing parsing filters 122, and optionally storing a plurality of failure indicators. In an embodiment, the parsing filters work without the failure indicators. In an example embodiment, the filters are the mechanism that collects information and formats the data for various outputs, for example to a database, a summary file, or feedback to a display. The failure detection is performed by an electronic component design process based on data returned by the parser/filters. In an example implementation, the plurality of stored failure indicators comprise a plurality of non-error triggers associated with later failures.

The apparatus 120 further comprises an extractor 124 configured to extract, based on the stored parsing filters and optionally in parallel and in a single pass, a plurality of non-error data types from electronic component design information produced by the one or more EDA tools to produce one or more summary files. The apparatus 120 further comprises a comparator 126 configured to determine whether an audit failure exists in a current design step of the plurality of design steps based on a comparison of the one or more summary files with one or more stored failure indicators. In example embodiments, the extractor 124 and the comparator 126 are configured to perform one or more of the steps described earlier in relation to FIG. 1 and the example embodiments described in relation thereto.

Figure 3:
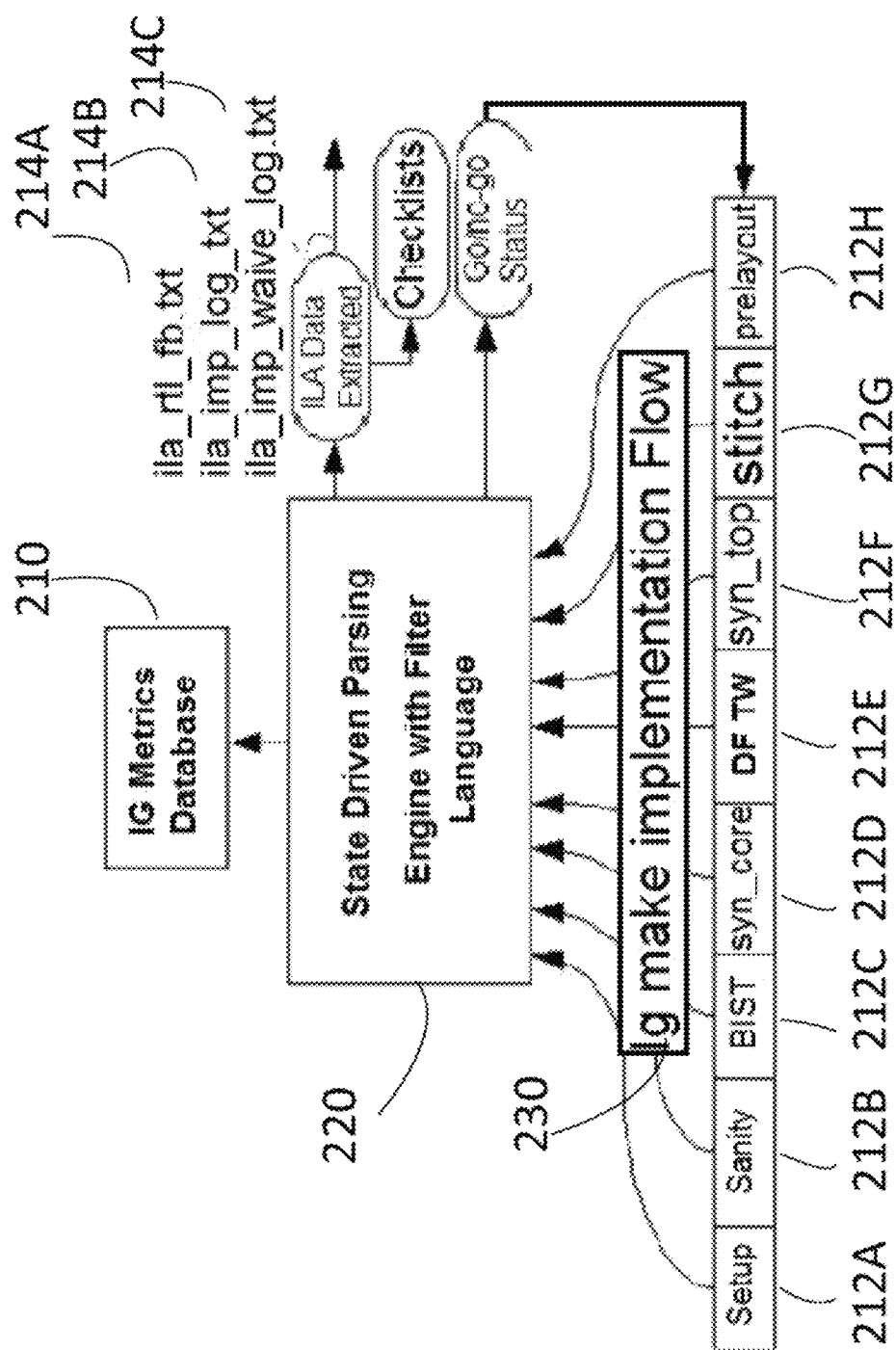
FIG. 3 is a block and flow diagram of an automated electronic device design process in accordance with an example embodiment of the present disclosure.

FIG. 3 is a block and flow diagram of an automated electronic device design process in accordance with an example embodiment of the present disclosure. In this example embodiment, a standardized automation design flow 240 referred to as ig_make utilizes EDA vendor tools to accomplish primary implementation tasks including, but not limited to synthesis, logical verification, DFT insertion and other common implementation tasks. This automated design flow, or electronic component design process, is divided into multiple design steps which call various EDA tools to complete associated tasks. Each design step is tracked and logged into a database 210 with Start and End times. In an example implementation, the database 210 of FIG. 3 is the same database as the database 110 of FIG. 2. Electronic component design information, including design files such as logs or reports generated by the EDA tools, is then parsed using a state driven parsing engine 220 including filters configured to extract non-error data types to determine if the design should proceed to the next step. In an example implementation, the state driven parsing engine 220 of FIG. 3 is the same as the apparatus 120 of FIG. 2.

Figure 4:
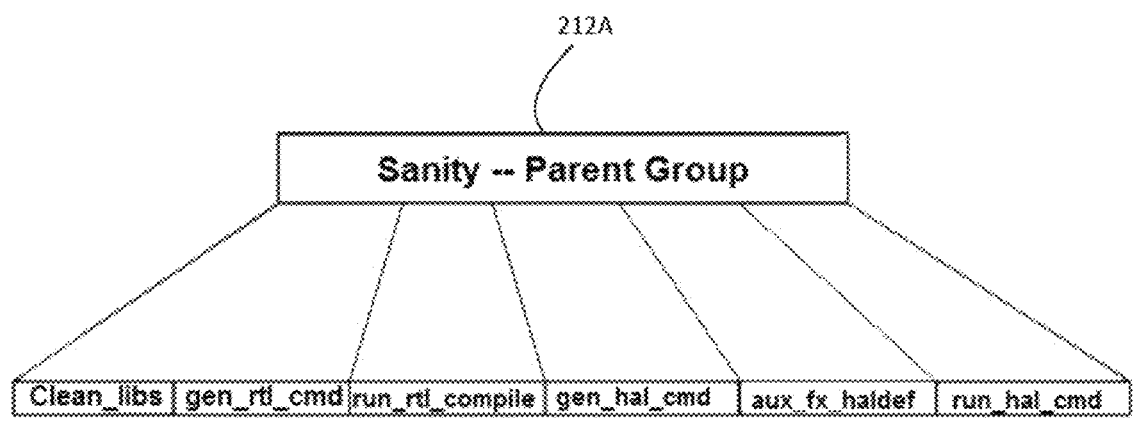
FIG. 4 is a block diagram of sub groups of the automated electronic device design process shown in FIG. 3.

Each of the EDA tool outputs 212A, 212B, ..., 212H in FIG. 3 comprises groups of steps in a much more granular flow. In an implementation, these groups 212A, 212B, ..., 212H are referred to as "Parent Groups" which contain Child Steps. An example of one Parent group 212A and its constituent child steps is shown in FIG. 4.

Each of these child steps produces some sort of output file. Either a log file or a report file, or possibly more than one report file, which can together be referred to as design files. Each of these design files is checked by parsing filters written to determine if the process is running correctly and according to the specification for this particular block, based on input criteria which were specified. The parsing filters include one or more failure indicators with which contents of the electronic component design information is compared. If the EDA tools report that an audit failure exists, the audit method only triggers on that event and stops forward progress until the issue is resolved so there is no more error, or condition that would cause a later error or failure.

In an example embodiment, such as shown in FIG. 3, a plurality of non-error data types extracted from the EDA log and report files are formatted into 3 output files 214A, 214B and 214C listed in FIG. 3 with the ila_prefix and are also stored in a design database (not shown). In an example embodiment, other summary files can be generated. The outcome of standardized analysis on the parsed out data will determine a Go/No-go Status relating to whether the automation process continues to the next step in the defined flow, or electronic component design process.

Embodiments of the present disclosure provide an in-line method of extracting information created by scripts and EDA tools log/report files using an Audit Parsing Engine and using that information to determine Go/No-Go status for each step defined in a multi-step build flow. The audit parsing engine, or parser, applies filters that are implemented by a state-machine like language to gather and format extracted data.

The extracted information is used as a governor on the implementation build flow to ensure each step in the process is operating within acceptable or pre-defined limits. Steps which fail the in-line auditing checks cause the automation flow to stop so issues or problems can be understood and resolved prior to re-starting the automation. Since EDA tools can be configured to stop on Error, a framework for such a mechanism is already enabled. Embodiments of the present disclosure go far beyond encountering an Error and provide added benefits by extracting non-error data types and enabling more advanced decisions to be made based on the quality of how the design is being processed.

Much of the parsed data is extracted into summary files, which are formatted files, for easier review. In an example embodiment, the parsed, formatted data is also stored in a design database, such as database 110 or 210, that contains or can contain information useful for future queries.

During a first pass through electronic component design information, for example in the form of a design file, the parser uses a state machine to extract data and either outputs the extracted data immediately or saves the extracted data to a memory stack for additional processing. The second pass through is a straight through execution that operates on the stack data. In an example embodiment, this secondary post-processing is limited to extracting values from a table, or excluding elements that have been waived and counting those exclusions or producing a shorter unique list.

In an implementation, operations supported by the state machine are separated into several categories, including: comments of different sorts so the single filter file can remain human readable; starting and stopping capabilities; movement capabilities besides starting and stopping to keep performance high; and special operations for the stack. While many stack operations are custom, some operations which can be classified into groups are: selecting which stack is being accessed; formatting information for writing to the audit files or to the database; and comparison and decision operations.

Figure 5A:
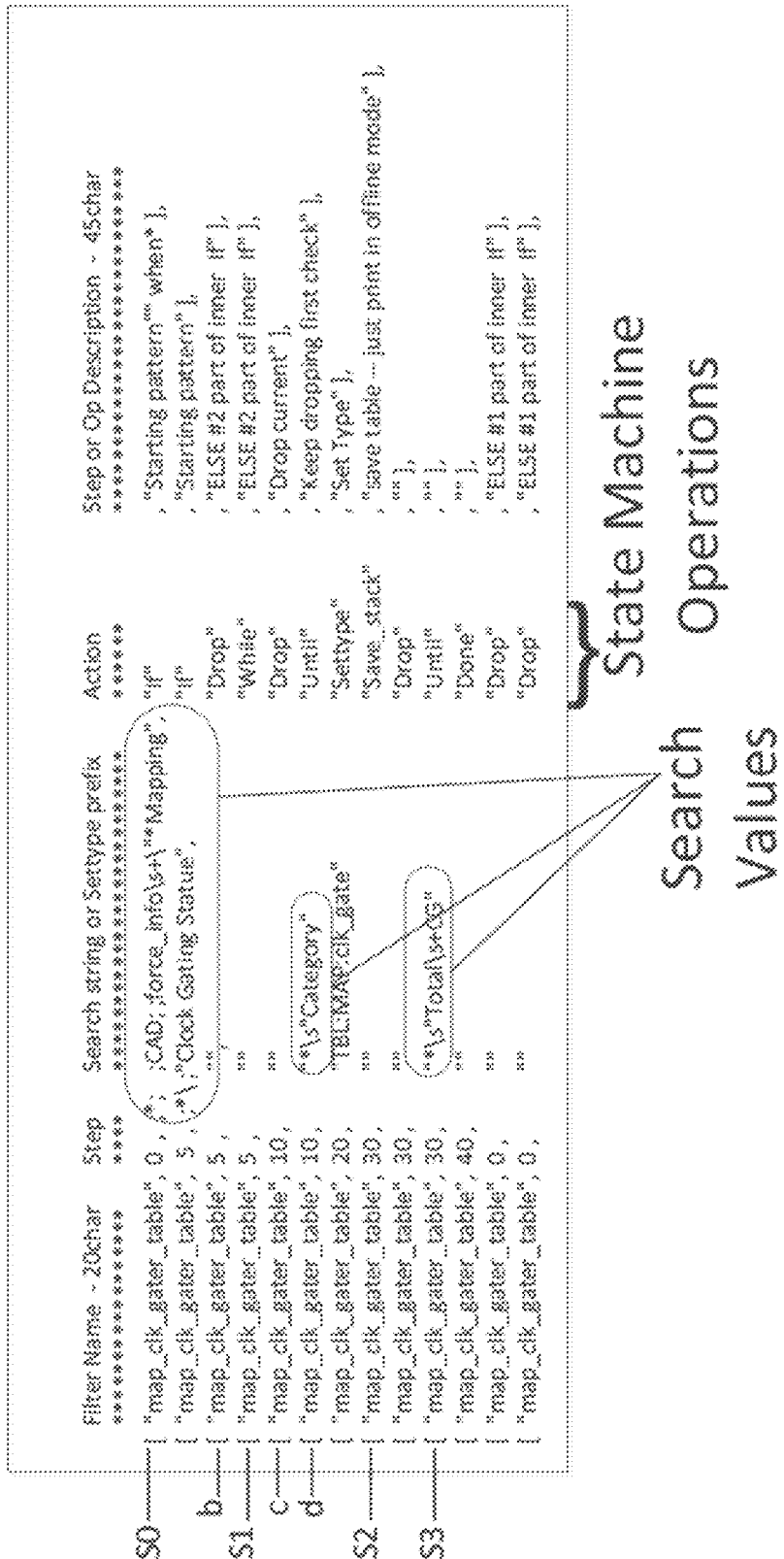
FIGS. 5a and 5b show example code and a state diagram associated with a parsing filter in accordance with an example embodiment of the present disclosure.
Figure 5B:
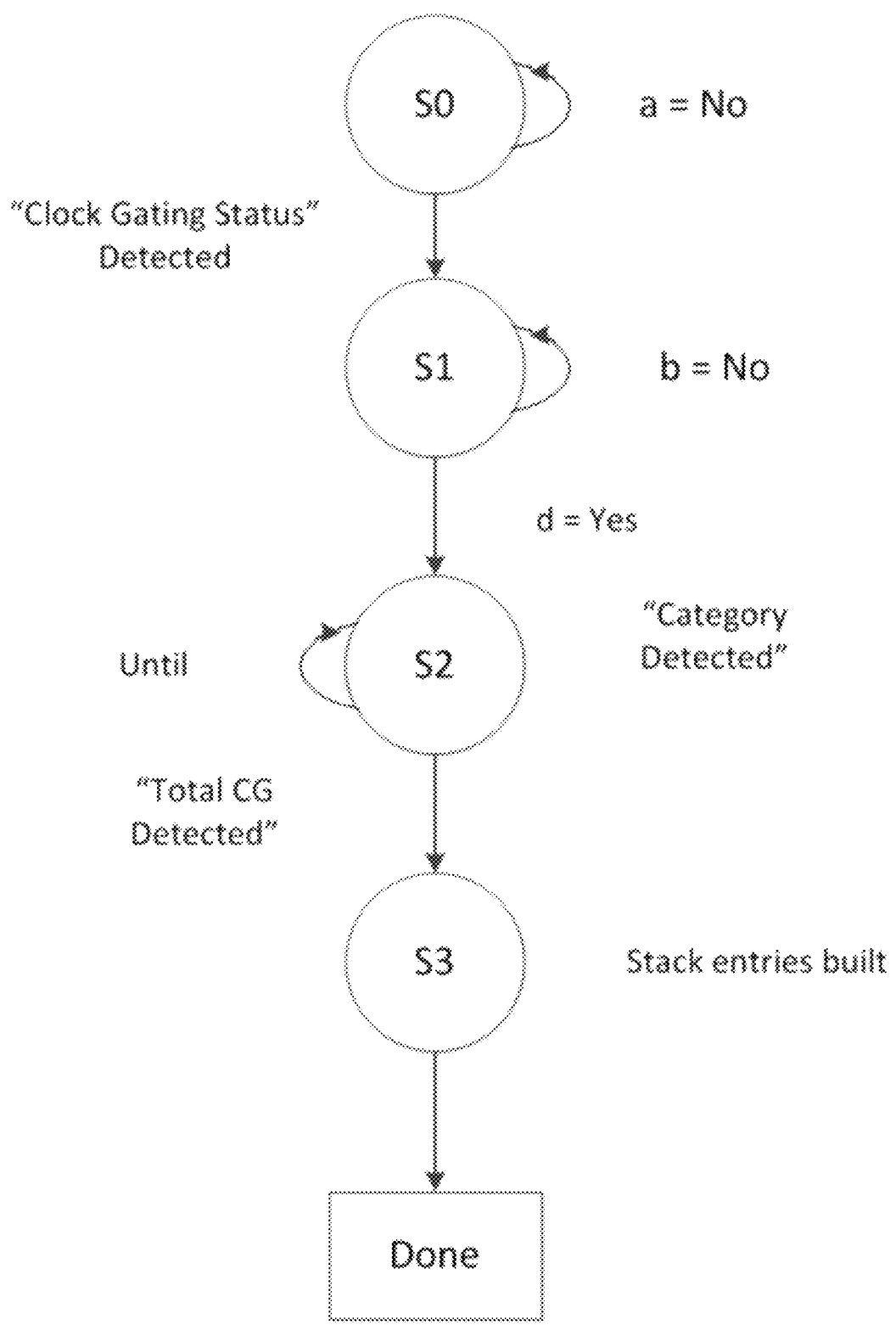

FIGS. 5a and 5b show example code and a state diagram associated with a parsing filter in accordance with an example embodiment of the present disclosure. FIG. 5a illustrates an example annotated filter for extracting a table from an EDA log file, including examples of search values and state machine operations. State machine operations are identified in the example code in FIG. 5a. Examples of state machine operations are shown in the state diagram in FIG. 5b, for example as: "clock gating status" detected; "category" detected; and "Total CG" detected.

Figure 6:
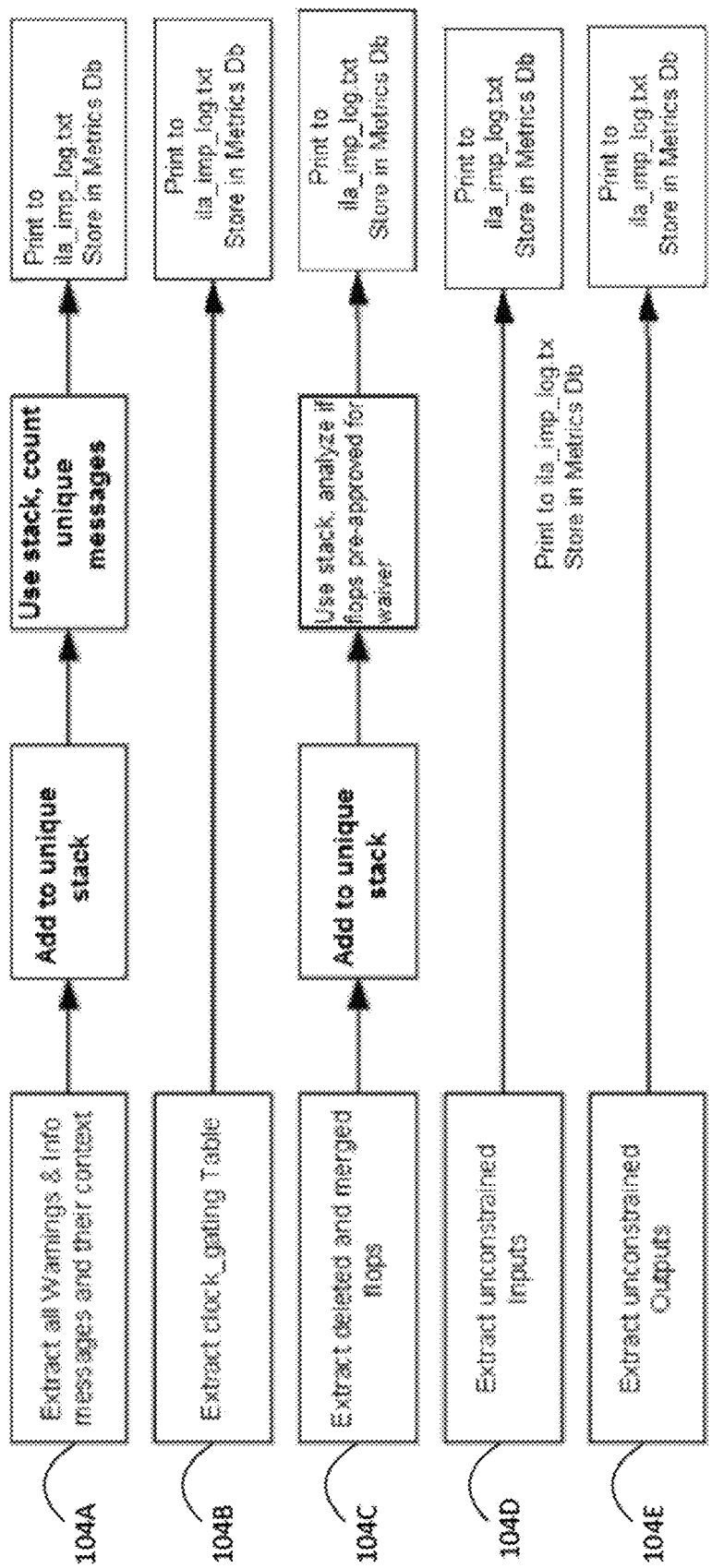
FIG. 6 is a flow chart illustrating an automated electronic device design process in accordance with an example embodiment of the present disclosure in which 3 summary files are generated.

FIG. 6 is a flow diagram illustrating a portion of an automated electronic device design process in accordance with an example embodiment of the present disclosure in which 3 summary files are generated. FIG. 6 illustrates example sub-steps 104A, 104B, 104C and 104D as sub-steps of the step 104 of extracting as shown in FIG. 1. In FIG. 6, in sub-step 104A the method extracts non-error messages, including warnings and other information messages and their context. The method also extracts in sub-steps 104B, 104D and 104E, three non-error non-message data types that are output directly to a summary file, then stored in a database; these three non-error non-message data types are a clock gating table, unconstrained inputs, and unconstrained outputs. In sub-step 104C, a further non-error non-message data type, in this case information related to deleted and merged flops, is extracted and added to a unique stack, and analyzed prior to outputting to a summary file. In an example embodiment, the non-error non-message data types comprise, or are used to generate, non-error design information.

FIG. 6 also shows how all warnings and information messages, and their context, are extracted, optionally in a single pass, and added to a first stack. After being extracted into the first stack, the extracted information is processed, using the first stack, to count unique messages. The result is then output to a summary file. Similarly, the deleted and merged flops are extracted and added to a second stack. After being extracted into the second stack, the extracted information is processed, using the first stack, to analyze if flops are pre-approved for waiver. The result is then output to a summary file. In an example embodiment, a plurality of memory stacks are employed, with each memory stack being assigned to a particular non-error data type.

Referring to the example of FIG. 6, this complicated set of filters has been shown to be extremely helpful in completing an audit early on using data collected, and then applying the learned knowledge throughout the rest of a design window or build. A first filter in that batch sent to the parser walks through the log file and collects information from about 4 different sources and puts it all on one stack. Another filter checks the list of registers deleted/merged against a separate list provided as an input file to the audit check. Registers which are approved for being deleted are added to a new stack, while registers which are not approved are written to another stack. Both stacks are written out to separate files.

In an example embodiment, as a design matures, the size of reviews decreases so the check is smaller and smaller. For example, the information can be provided to a designer for review through multiple iterations and at the final code release, there is a final check and all registers expected to be deleted/merged (essentially optimized away) are approved, so the design moves quickly through that step and the final check is completed quickly.

A specific example embodiment of the method of the present disclosure will now be described. In this example embodiment, the parsed out information is extracted into 3 summary files (ila_rtl_fb.txt, ila_imp_log.txt, ila_imp waive_log.txt).

Building an Example Summary File (ila_rtl_fb.txt)

The ila_rtl_fb.txt file is used to feed specific information back to the RTL coders regarding their block to confirm there are no issues, coding guidelines have been met and to ensure the RTL meets the specific EDA tool requirements. A filter was created that extracts certain Warning messages from the synthesis log files, and a separate filer which gathers a few Information messages that have been determined should be reviewed by the RTL designer to ensure quality handoffs. To build the ila_rtl_fb.txt file, the electronic component design information including synthesis log files and several reports are parsed to provide or extract the following non-error data types, which in an example embodiment are extracted for, and provided to, an RTL designer: specific warning messages; specific information messages; gate count and VT mix; and timing summary.

FIG. 7 illustrates a sub-set of extracted warning messages according to an example embodiment of the present disclosure.

FIG. 8 illustrates a sub-set of extracted specific information messages according to an example embodiment of the present disclosure. In an example embodiment, the list of information messages is extensive, that a sub-set of the messages is extracted.

FIG. 9 illustrates filters to extract gate count and VT mix and information according to an example embodiment of the present disclosure. The example filters shown in FIG. 9 are 2 separate filters which extract specific design details which are saved to the ila_imp_log.txt and to the Metrics database, such as the database 110 or 210, for future reference, and can be provided to the RTL designer.

Figure 10:
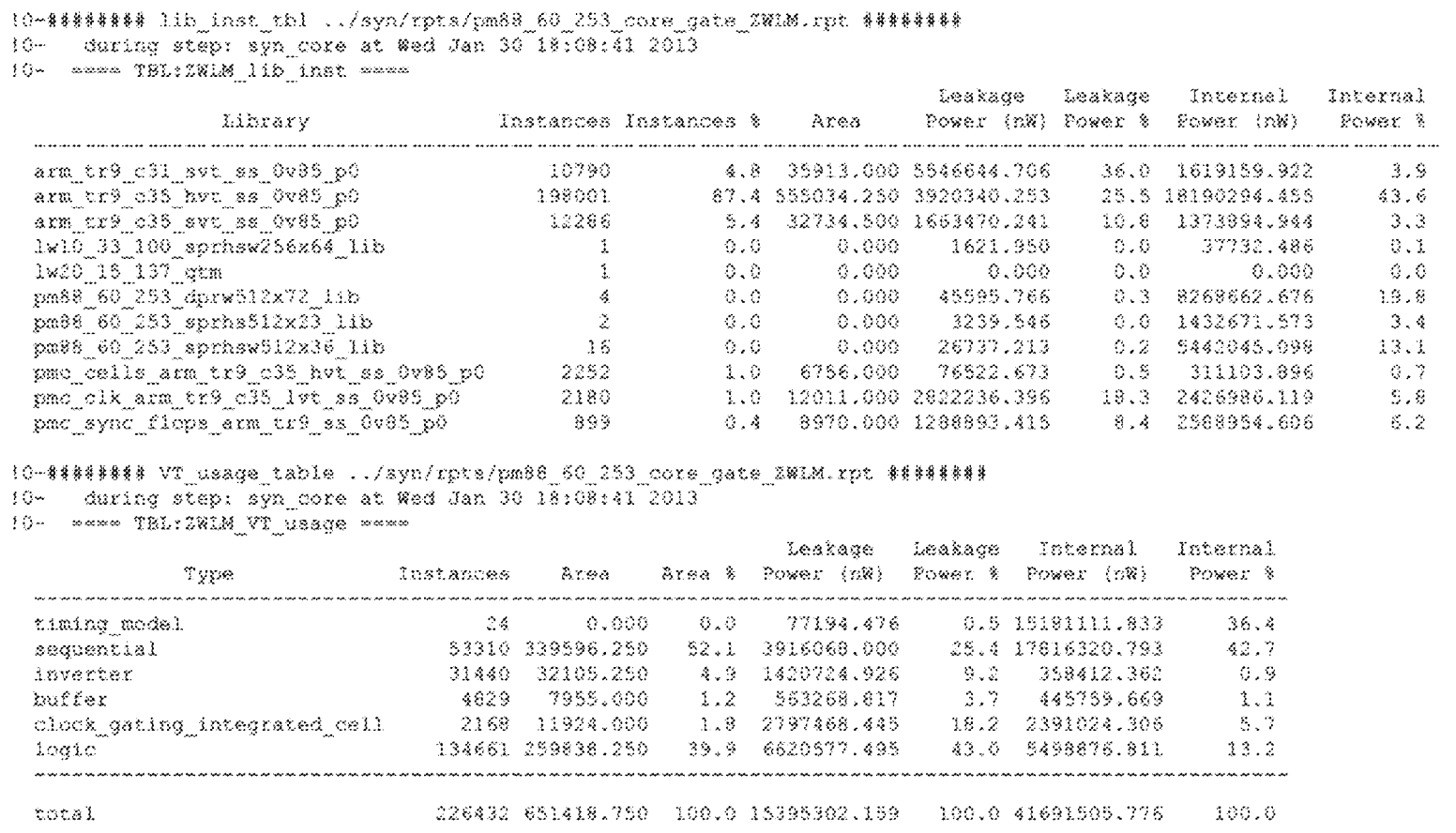

FIG. 10 illustrates an example table extracted using the filter of FIG. 9 above which is output to the ila_rtl_fb.txt file, according to an example embodiment of the present disclosure. In an example implementation, between extraction and outputting, the table is formatted based on one or more of an associated child step, file or output summary.

FIG. 11 illustrates filters to extract a power summary according to an embodiment of the present disclosure and a power summary extracted using those filters according to an example embodiment of the present disclosure.

In an implementation, all of the message types listed above and extracted from the synthesis log file and QoR reports are re-directed into the ila_rtl_fb.txt file for further follow up and review. In an example embodiment, the ig_make program allows messages, but not collected design information, to be waived via a configuration entry for future runs if the messages are approved.

Measuring Clock Gating Percentage

With the In-line Audit and Parsing technology, for example, the Clock Gating percentage value can be extracted from the synthesis log file and compared to a preset threshold to determine if the IP-core build process should continue beyond initial synthesis. The parser extracts the information and, for example, the ig_make script flow compares that against the threshold.

An example of the table extract out to the lia_rtl_fb.txt file is shown in FIG. 12.

Counting the Number of Flops Optimized Away

FIG. 13 illustrates a filter to extract information used to count a number of flops deleted or merged together during a design process according to an example embodiment of the present disclosure. In an example implementation, in conjunction with FIG. 13, the method counts the number of flip-flops which were deleted or merged together during a synthesis build. That value is then compared to the previous build.

Detecting if DFT Lock Up Latches Were Inserted

FIG. 14 illustrates a filter to extract information used to detect if lockup latches were inserted during a design process according to an example embodiment of the present disclosure. A method according to an embodiment of the present disclosure can extract, in accordance with the filter of FIG. 14, if lockup latches were inserted and stop the build flow if there were some which were not intended. This check can save time downstream because it will normally take until running ATPG or STA before these might be noticed.

Detecting Scan Chains Beyond a Limit

FIG. 15 illustrates a filter to extract information used to detect when scan chains are stitched during a design process according to an example embodiment of the present disclosure. Yet another example of using data extracted from an IP-core build process is when scan chains are stitched, the audit method extracts out how long the chains are, such as in conjunction with the filter of FIG. 15. That information can be passed back to ig_make so the IP-core build process can be stopped, or a process termination indication is generated, if the chains are too short or too long as compared to desired limits.

Any number of decisions can be made based on the data extracted from the report & log files. These checks listed are a tiny set of decisions which can be integrated to guide the build process and enhance the quality of deliverables with minimal wasted time.

Advantageously, the method of the present disclosure reduces the time spent gathering/extracting design information from the EDA tool, raises the level of accuracy and consistency of the extracted information, and simplifies the review of the information.

The In-Line Audit architecture with parsing engine and filter language assist engineers and managers easily extract important information in an automated EDA flow.

Embodiments of the present disclosure provide an in-line audit architecture including a method of collecting and consolidating informational design data from log and report files which is then used to determine Go/No-Go status in an EDA automation environment. This is different than conventional methods which may terminate an EDA tool only based on errors reported in a log file or terminating based on failed exit status of an EDA tool or shell script calling the EDA tool.

In an example embodiment, the Audit Parsing Engine and configurable filter language are used to extract information based on a state machine like sequence so large pieces of complex information can be rendered quickly to help determine the Go/No-Go status. This status will determine if the design is building in-line with expectations or if there are deviations which would necessitate the automated flow to stop, rather than continuing and wasting time and computing resources (machines and licenses).

In an implementation, filters can be written using the language constructs which extract orthogonal details can be chained together and be run in a single pass over one file. This saves significant time when extracting vast amounts of data. In an implementation, information from some filters is placed on a stack where the data undergoes additional processing to format the stack data.

In an implementation, information and data extracted by the Audit Parsing Engine are kept in a database so history of the steps completed in the flow can be viewed and queried for status using custom designed or 3rd party database query/visualization tools. Design data stored in the database can be used for design audits and other future purposes including automatically filling in checklists with that design information for a specific design.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of automatically auditing an electronic component design process comprising a plurality of design steps, the method comprising:
    obtaining at least one design file comprising electronic component design information generated by one or more electronic design automation (EDA) tools;
    extracting a plurality of non-error data types from the at least one design file;
    producing one or more summary files using the extracted plurality of non-error data types; and
    determining whether an audit failure exists in a current design step of the plurality of design steps based on a comparison of the one or more summary files with one or more stored failure indicators, the one or more stored failure indicators comprising a plurality of non-error triggers associated with later failures,
    wherein the method is executed using a computer processor.

2. The method of claim 1 wherein obtaining comprises aggregating data generated by a plurality of EDA tools to obtain the electronic component design information.

3. The method of claim 1 wherein determining comprises determining that an audit failure exists in the current design step in response to detection of a match between contents of the one or more summary files and one of the plurality of non-error triggers.

4. The method of claim 1 wherein determining comprises determining that an audit failure exists in the current design step in response to detection of a match between one of the plurality of non-error data types in the one or more summary files and selected non-error data in the one or more stored failure indicators.

5. The method of claim 1 further comprising generating a process termination indication in response to determining that an audit failure exists in the current design step.

6. The method of claim 1 wherein determining comprises determining that the current design step is free of an audit failure and represents an audit success in response to an absence of the plurality of non-error triggers from contents of the one or more summary files.

7. The method of claim 1 wherein the one or more stored failure indicators comprise a correlation of the plurality of non-error triggers with the later failures with respect to a stored design step corresponding to the current design step.

8. The method of claim 1 wherein the later failures comprise failures that occur at a second design step that is subsequent to the current design step in the electronic component design process.

9. The method of claim 1 wherein the obtaining is performed in relation to a subset of the electronic component design information associated with the current design step, and wherein the extracting is performed with respect to a subset of the plurality of non-error data types.

10. The method of claim 1 wherein the at least one design file comprises a single design file, and wherein the extracting the plurality of non-error data types from the single design file is performed in parallel and in a single pass.

11. The method of claim 10 wherein the plurality of non-error data types comprises first and second sets of non-error data types, and wherein extracting in the single pass comprises:
    outputting the first set of non-error data types to the one or more summary files; and
    storing the second set of non-error data types in a memory stack for additional processing subsequent to the single pass.

12. The method of claim 11 further comprising processing the second set of non-error data types in the memory stack to produce a remaining portion of the one or more summary files.

13. The method of claim 1 wherein the obtaining, extracting and determining are performed during the electronic component design process in a single clock cycle per extraction.

14. The method of claim 1 wherein the extracting is performed based on stored parsing filters comprising the one or more stored failure indicators, and the method further comprises extracting and chaining together a plurality of orthogonal non-error data types so as to perform the extracting in a single pass.

15. The method of claim 1 wherein the at least one design file comprises a single design file, and wherein the extracting the plurality of non-error data types from the single design file is performed sequentially.

16. The method of claim 1 wherein the at least one design file comprises a plurality of design files, and wherein the extracting the plurality of non-error data types from the plurality of design files is performed in parallel.

17. The method of claim 16 wherein extracting the plurality of non-error data types from the plurality of design files is performed in a single pass.

18. A system for auditing an electronic component design process, the process including a plurality of design steps which call one or more electronic design automation (EDA) tools to complete the design steps, the system comprising:
    a database configured to receive and store at least one design file comprising electronic component design information generated by the EDA tools; and a design automation process analyzer, in communication with the database, configured to extract details of interest from the at least one design file in accordance with parsing filters and to generate one or more summary files using the extracted details of interest, and to determine whether an audit failure exists in a current design step of the plurality of design steps based on a comparison of the one or more summary files with one or more stored failure indicators, the one or more stored failure indicators comprising a plurality of non-error triggers associated with later failures.

19. The system of claim 18 further comprising a filter memory, in communication with the design automation process analyzer, storing the parsing filters configured to extract details of interest for generating the one or more summary files.

20. The system of claim 18 further comprising a memory stack, in communication with the design automation process analyzer, configured to store a subset of non-error data types for additional processing subsequent to the single pass.

21. The system of claim 18 further comprising a plurality of memory stacks, in communication with the design automation process analyzer, each of the plurality of memory stacks configured to store a unique subset of non-error data types for additional processing subsequent to the single pass.

22. The system of claim 18 wherein the database is configured to receive and store start and end times for each of the plurality of design steps.

23. An apparatus for auditing an electronic component design process, the process including a plurality of design steps which call one or more electronic design automation (EDA) tools to complete the design steps, the apparatus comprising:
   a memory storing parsing filters and a plurality of failure indicators, the plurality of stored failure indicators comprising a plurality of non-error triggers associated with later failures;
   an extractor configured to extract, based on the stored parsing filters, a plurality of non-error data types from at least one design file and to produce one or more summary files using the extracted plurality of non-error data types, the at least one design file comprising electronic component design information produced by the one or more EDA tools; and
   a comparator configured to determine whether an audit failure exists in a current design step of the plurality of design steps based on a comparison of the one or more summary files with one or more stored failure indicators.

24. An apparatus for auditing an electronic component design process, the process including a plurality of design steps which call one or more electronic design automation (EDA) tools to complete the design steps, the apparatus comprising:
   a memory storing parsing filters;
   an extractor configured to extract, based on the stored parsing filters, a plurality of non-error data types from at least one design file and to produce one or more summary files using the extracted plurality of non-error data types, the at least one design file comprising electronic component design information produced by the one or more EDA tools; and
   a comparator configured to determine whether an audit failure exists in a current design step of the plurality of design steps based on a comparison of the one or more summary files with one or more stored failure indicators, the one or more stored failure indicators comprising a plurality of non-error triggers associated with later failures.

* * * * *